(12) United States Patent  (10) Patent No.: US 8,444,749 B2
Sanders et al.  (45) Date of Patent: May 21, 2013

(54) METHOD AND SYSTEM FOR MEMBRANE-BASED GAS RECOVERY

(75) Inventors: Edgar S. Sanders, Newark, DE (US); Sarang Gadre, Bear, DE (US); Michael D. Bennett, New Castle, DE (US); Ian C. Roman, Bear, DE (US); David J. Hasse, Bel Air, MD (US); Indrasis Mondal, Bear, DE (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 711 days.

(21) Appl. No.: 12/502,806

(22) Filed: Jul. 14, 2009

(65) Prior Publication Data

US 2010/0313750 A1  Dec. 16, 2010

Related U.S. Application Data

(60) Provisional application No. 61/185,965, filed on Jun. 10, 2009.

(51) Int. Cl.
*B01D 53/22* (2006.01)

(52) U.S. Cl.
USPC ............ 95/45; 95/1; 95/3; 96/4; 96/397; 96/408

(58) Field of Classification Search
USPC ............ 95/45, 1–24; 96/4, 397–412
See application file for complete search history.

(56) References Cited

U.S. PATENT DOCUMENTS

| | | | |
|---|---|---|---|
| 3,208,197 A | 9/1965 | Simon et al. | |
| 3,975,170 A * | 8/1976 | Keating, Jr. | 95/23 |
| 4,119,417 A | 10/1978 | Heki et al. | |
| 4,230,437 A | 10/1980 | Bellinger et al. | |
| 4,448,582 A | 5/1984 | Johnson | |
| 4,806,132 A * | 2/1989 | Campbell | 95/12 |
| 4,944,776 A * | 7/1990 | Keyser et al. | 95/10 |
| 5,118,327 A * | 6/1992 | Nelson et al. | 95/10 |
| 5,158,625 A | 10/1992 | Lhote et al. | |
| 5,281,253 A * | 1/1994 | Thompson | 95/22 |
| 5,377,491 A | 1/1995 | Schulte | |
| 5,452,583 A | 9/1995 | Schulte | |

(Continued)

FOREIGN PATENT DOCUMENTS

| | | |
|---|---|---|
| EP | 0 079 186 | 5/1983 |
| EP | 0 110 858 | 6/1984 |

(Continued)

OTHER PUBLICATIONS

International Search Report and Written Opinion for PCT/US2010/037892, mailed Oct. 26, 2010.

(Continued)

*Primary Examiner* — Jason M Greene
*Assistant Examiner* — Anthony Shumate
(74) *Attorney, Agent, or Firm* — Christopher J. Cronin (57) ABSTRACT

A fast gas is recovered from a feed gas containing a fast gas and at least one slow gas using a gas separation membrane. A controller may control a control valve associated with a partial recycle of a permeate gas from the membrane for combining with the feed gas. A controller may control a control valve associated with the backpressure of a residue gas from the membrane.

13 Claims, 6 Drawing Sheets

U.S. PATENT DOCUMENTS

| | | | |
|---|---|---|---|
| 5,890,376 A | 4/1999 | Chludzinski | |
| 6,092,391 A | 7/2000 | Chludzinski | |
| 6,125,638 A | 10/2000 | Ji et al. | |
| 6,197,090 B1 * | 3/2001 | Yamashita et al. | 95/12 |
| 6,253,575 B1 | 7/2001 | Chludzinski | |
| 6,345,451 B1 | 2/2002 | Arslanian et al. | |
| 6,517,791 B1 | 2/2003 | Jaynes | |
| 6,649,047 B1 * | 11/2003 | Ottestad | 210/90 |
| 6,668,582 B2 | 12/2003 | Paganessi | |
| 6,669,922 B1 * | 12/2003 | Fuentes | 423/648.1 |
| 6,790,400 B1 | 9/2004 | Muller et al. | |
| 7,067,087 B2 | 6/2006 | Jaynes | |
| 7,168,256 B2 | 1/2007 | Shedletsky et al. | |
| 7,169,210 B2 * | 1/2007 | Baksh et al. | 95/11 |
| 2003/0129114 A1 | 7/2003 | Jaynes | |
| 2004/0050094 A1 | 3/2004 | Thonnelier et al. | |
| 2007/0113589 A1 | 5/2007 | Paganessi | |

FOREIGN PATENT DOCUMENTS

| | | |
|---|---|---|
| EP | 0 692 297 | 1/1996 |
| EP | 0 820 963 | 1/1998 |
| FR | 2 808 793 | 11/2001 |
| WO | WO 99/06137 | 2/1999 |
| WO | WO 99/36159 | 7/1999 |

OTHER PUBLICATIONS

Laguntsov, et al., "The use of recycle permeator systems for gas mixture separation," Journal of Membrane Science, 67, 1992, pp. 15-28.

Xu, et al., "Gas separation membrane cascades I. One-compressor cascades with minimal exergy losses due to mixing," Journal of Membrane Science, 112, 1996, pp. 115-128.

* cited by examiner

METHOD AND SYSTEM FOR MEMBRANE-BASED GAS RECOVERY

CROSS-REFERENCE TO RELATED APPLICATIONS

This patent application claims the benefit of U.S. Provisional Patent Application No. 61/185,965 filed Jun. 10, 2009.

BACKGROUND

There are numerous processes utilizing gases where, due to the relatively high cost of the gas, it would be desirable to recover them. Many of such processes, however, will produce varying amounts of the gas for recovery. So, an ideal recovery system will efficiently and economically recover the gas even though the amount of gas able to be recovered varies over time. Two of these processes includes optical fiber cooling towers for the production of optical fibers and also heat treating of parts in vacuum furnaces. Those skilled in the art of gas separation will recognize that there are numerous other processes which produce such variable flows and for which recovery of a relatively expensive gas may be desirable.

In the production of optical fibers, molten glass is extruded through a die. The molten glass is rapidly quenched using a long cooling tower (draw tower). To enhance heat transfer in the cooling tower, Helium is used to as a heat transfer medium. Because Helium supplies are short and prices are increasing, capture and recycle of the Helium is desired.

The recycling of Helium from the cooling draw tower for optical fiber spinning is a demanding application. Due to addition of air to the Helium during the recovery process from the tower, extracted Helium can contain as low as 60% Helium by volume with a balance of air. It would be desirable to have a high recovery of high purity Helium. A high purity Helium product (for example, >99% vol/vol) for recycle to the cooling tower is required for cooling efficiency, while a usefully high Helium recovery is required for economic justification of the recovery process.

Typical fiber optic spinning facilities contain multiple towers. The Helium flow per tower will vary depending on the cooling needs of the tower. Conceivably, each tower can have a different Helium feed flow. For economic reasons, it would be preferable to treat multiple towers with a singe Helium recovery system. Such a potential system ideally would be able to compensate for these changes in flow. Thus, such a potential system must be able to operate with wide variation in feed flow as individual draw towers are added to service or removed from service.

One type of gas separation technology is gas separation by membranes, in particular, polymeric membranes. Membrane-based gas separation is performed by feeding a feed gas to an inlet of a gas separation membrane. Depending upon the composition of the polymeric membrane, some gases (called fast gases) will permeate across the membrane to a greater degree than other gases (called slow gases). The fast gas(es) is collected in a permeate stream while the slow gas(es) is collected a retentate or residue stream. Several have proposed the use of membranes to recover Helium from optical fiber cooling towers. In the case of glassy polymeric membranes, Helium is the fast gas while the air gases Oxygen and Nitrogen are the slow gases. Membrane systems are typically designed based on a fixed feed flow rate. In other words, the number of membrane modules of a given type of membrane is designed based upon an expected fixed flow rate of feed gas to process The number of membrane modules required for a given application is directly proportional to the feed flow. For high feed flow membrane systems, a large number of membrane modules are required. Turndown is the parameter which describes the capability of a process or system to handle changes in the feed flow relative to the maximum flow. It may be expressed in terms of the following equation:

$$\text{Turndown} = \left(1 - \frac{\text{actual feed flow}}{\text{maximum feed flow}}\right) \times 100\%$$

Changes in the turndown for relatively large systems can be easily accommodated by activating or deactivating one or more of the multiple membrane modules. In short, the total membrane surface area subjected to the feed gas is adjusted to compensate for changes in feed flow.

For relatively low feed flow systems, such as optical fiber draw columns, this multiple-module approach is challenging. This is because at the maximum flow the desired product purity and recovery may be achieved with only a single commercial scale membrane module. For example, a single 1" or 2" diameter membrane (often the smallest commercially available membrane device) may be sufficient for the maximum flow. While the use of a single membrane module may be cost effective in terms of capital expense, unacceptable performance may be realized at flows significantly lower than the maximum flow. One potential solution to address the problem associated with such low flows is to utilize the above-mentioned multiple module approach. In order to adapt the multiple module approach to such low flows, numerous custom manufactured small permeators would need to be used. Thus, this becomes a highly customized and inefficient (cost-wise) solution.

In the heat treating of parts in vacuum furnaces, the relatively high temperature of the parts is quickly quenched with the use of inert cooling gas, such as Helium. Depending upon the amount of parts needing heat treatment, one or more of the vacuum furnaces may be placed in operation or taken out of operation. While some have proposed various strategies for recycling the cooling gas including a purification step which may involve the use of gas separation membranes. Similar to the recycling of Helium from optical fiber cooling towers, it would be preferable for economic reasons to recycle inert gases such as Helium from multiple vacuum furnaces using a single gas recovery system, such as one utilizing gas separation membranes. Such a potential system ideally would be able to compensate for a wide variation in feed flow as individual vacuum furnaces are added to service or removed from service.

With regard to Helium in particular, several have proposed various recovery strategies in the patent literature.

U.S. Pat. No. 6,517,791 describes a Helium recovery system for cold spray forming. The membrane operates in a single pass. Purification goals for the system are to increase Helium content from approximately 90% He to 97% He, a relatively narrow upgrade. In contrast, Helium recovery for optical fiber spinning often requires relatively greater enrichment of the gas.

U.S. Pat. No. 4,448,582 uses a cryogenic method for recovering Helium for recycling in an optical fiber draw tower.

U.S. Pat. Nos. 5,377,491 and 5,452,583 also pertain to recycling of Helium from an optical fiber draw tower. A membrane is described as one of several methods to purify Helium for recycle in the draw tower.

Similarly U.S. Pat. Nos. 6,092,391 and 6,253,575 B1 describe more complete Helium recovery systems for the entire optical fiber spinning process including consolidation, draw furnace and draw fiber cooling. A membrane system is described as one means for recovering the Helium.

U.S. Pat. No. 5,158,625 discloses a process for heat treating articles by hardening them in a recirculating gas medium which is in contact with the treated articles, the hardening gas being cooled by means of a heat exchanger, of the type in which Helium is used as hardening gas. At the end of a hardening operation, a Helium load is extracted from the treatment enclosure, in final phase by means of pump until a primary vacuum is obtained. The extracted Helium is brought to purifying pressure by means of a compressor associated to a mechanical filter and the Helium under purifying pressure is sent to a purifier in which impurities are removed.

U.S. Pat. No. 6,517,791 discloses a three-stage process for recovering and purifying a helium gas, and a system for using the three-stage process. A gas from a cold spray forming chamber is introduced to a particulate removing apparatus to form a particulate-free Helium gas. A first portion of the particulate-free Helium gas is recycled back to the chamber. A second portion of the particulate-free Helium gas is passed to a first compressor prior to passing a Helium gas purification membrane to form a purified Helium gas and an exhaust gas. The purified Helium gas is then passed to mix with the first portion of particulate-free Helium gas to the chamber. A third portion of the particulate-free Helium gas is passed to a liquid separator apparatus to remove water and a receiver to dampen any pulsation to form a liquid-free helium gas. The liquid-free Helium gas is recycled to the cold spray forming chamber.

Although the above patent literature discloses various solutions, none disclose methods satisfactorily addressing the issue of a broad range of feed flow rate.

Thus, it is an object to provide an improved method and system for membrane-based recovery of a gas which is adapted to achieve a sufficiently high purity over a wide range of feed flow rates.

It is another object to provide an improved method and system for membrane-based recovery of a gas which is adapted to achieve a sufficiently high recovery over a wide range of feed flow rates.

It is yet another object to provide an improved method and system for membrane-based recovery of a gas which is adapted to satisfactorily perform over a wide range of feed flow rates while incurring satisfactorily low capital costs.

SUMMARY

There is disclosed a method of recovering a fast gas from a process producing a varying flow rate of an exhaust gas comprising a fast gas and at least one slow gas. The method includes the following steps. A plurality of sources of a gas mixture are provided wherein the gas mixture comprises the fast and slow gases. A feed gas stream is obtained from one or more of the sources, wherein the feed gas stream comprises the fast and slow gases, and the feed gas stream hays a variable flow rate based upon how many of the plurality of sources are actively producing the gas mixture. The feed gas stream is compressed. The compressed feed gas is fed to a primary gas separation membrane. A primary permeate stream enriched in the fast gas and a primary residue stream deficient in the fast gas is withdrawn from the primary gas separation membrane. A first portion of the primary permeate stream is directed to the compressor, wherein the first portion is comingled and compressed with the feed gas stream. A remaining portion of the primary permeate stream is withdrawn to provide a product gas. A degree to which the primary permeate stream is allocated between the first portion and the remaining portion is adjusted based upon an operating parameter of the method.

There is also disclosed a system for recovering a gas of interest from a process producing a varying flow rate of an exhaust gas. The system includes: a plurality of sources of an exhaust gas; a feed gas conduit in selective fluid communication with the plurality of sources; a compressor having an inlet in fluid communication with the feed gas conduit and an outlet; a primary gas separation membrane having an inlet, a permeate outlet and a residue outlet; a primary permeate conduit in fluid communication with the permeate outlet of the primary gas separation membrane; a product gas conduit in fluid communication with the primary permeate conduit; a recycle conduit in fluid communication between the primary permeate conduit and the compressor inlet; a recycle control valve in fluid communication with the primary permeate conduit, the recycle conduit, and the product gas conduit; and a controller adapted to control the proportionate adjustment by the recycle control valve. The exhaust gas includes a fast gas and at least one slow gas. The recycle control valve is adapted to adjust a proportion of permeate gas that is allowed to flow from the primary permeate conduit to the recycle conduit versus the product gas conduit. The inlet of the primary gas separation membrane is in fluid communication with the compressor outlet. The primary gas separation membrane being preferentially permeable to the fast gas versus the at least one slow gas.

The method and/or system may include one or more of the following aspects:

- the operating parameter is selected from the group consisting of a number of the plurality of sources from which the feed gas stream is obtained, a purity of the product gas, a recovery of the gas of interest achieved by performance of said method, a flow rate of the feed gas stream, and a pressure of the combined feed gas stream and first portion of the primary permeate stream.
- the plurality of sources comprises a plurality of optical fiber cooling towers, the fast gas is Helium, and the slow gas is air.
- the plurality of sources comprises a plurality of Helium furnaces and the fast gas is Helium.
- the method further comprises the steps of:
    - feeding the primary residue stream to a secondary gas separation membrane;
    - withdrawing from the secondary gas separation membrane a secondary permeate stream and a secondary residue stream; and
    - directing the secondary permeate stream to the compressor, wherein the secondary permeate stream is compressed with the first portion and the feed gas stream.
- said step of obtaining a feed gas stream comprises the steps of:
    - combining exhaust gas streams from one or more of the plurality of sources;
    - compressing the combined exhaust gas streams;
    - feeding the compressed combined exhaust gas streams to a secondary gas separation membrane; and
    - withdrawing from the secondary gas separation membrane a secondary permeate stream enriched in the fast gas and a secondary residue stream deficient in the fast gas, wherein the secondary permeate is the feed gas stream.
- the method further comprises the steps of:
    - providing a control valve in fluid communication with the primary permeate stream; and sending a signal to a controller representative of the number of the plurality of sources from which the feed gas stream is obtained, wherein:
the operating parameter is the number of the plurality of sources from which the feed gas stream is obtained; and
the controller controls the allocation of the primary permeate stream into the first portion and the remaining portion via the control valve based upon the signal.
the method further comprises the steps of:
providing a control valve in fluid communication with the primary residue stream, the control valve being adapted to selectively adjust a pressure of the primary residue stream;
measuring a purity of the fast gas in the product gas; and
sending a signal to the controller representative of the measured purity, wherein the controller controls the adjustment of the pressure of the primary residue stream based upon the measured purity via the control valve in fluid communication with the primary residue stream.
said step of obtaining a feed gas stream comprises the steps of:
combining exhaust gas streams from one or more of the plurality of sources;
compressing the combined exhaust gas streams;
feeding the compressed combined exhaust gas streams to a secondary gas separation membrane; and
withdrawing from the secondary gas separation membrane a secondary permeate stream enriched in the fast gas and a secondary residue stream deficient in the fast gas, wherein the secondary permeate is the feed gas stream.
the method further comprises the steps of:
providing a control valve in fluid communication with the secondary residue stream, the control valve being adapted to selectively adjust a pressure of the secondary residue stream;
determining a purity of the fast gas in the product gas; and
sending a signal to the controller representative of the measured purity, wherein the controller controls the adjustment of the pressure of the secondary residue stream based upon the measured purity via the control valve in fluid communication with the secondary residue stream.
the method further comprises the steps of:
providing a control valve in fluid communication with the primary permeate stream;
determining a recovery of the fast achieved by performance of said method;
sending a signal to a controller representative of the determined recovery, wherein:
the operating parameter is the recovery of the gas of interest achieved by performance of said method;
the controller controls the allocation of the primary permeate stream into the first portion and the remaining portion based upon the signal via the control valve.
the method further comprises the steps of:
providing a control valve in fluid communication with the primary residue stream, the control valve being adapted to selectively adjust a pressure of the primary residue stream;
measuring a purity of the fast gas in the product gas;
sending a signal to a controller representative of the measured purity, wherein the controller controls the adjustment of the primary residue stream pressure based upon the product gas purity signal via the control valve in fluid communication with the primary residue stream.
said step of obtaining a feed gas stream comprises the steps of:
combining exhaust gas streams from one or more of the plurality of sources;
compressing the combined exhaust gas streams;
feeding the compressed combined exhaust gas streams to a secondary gas separation membrane; and
withdrawing from the secondary gas separation membrane a secondary permeate stream enriched in the fast gas and a secondary residue stream deficient in the fast gas, wherein the secondary permeate is the feed gas stream; and
the method further comprises the steps of:
providing a control valve in fluid communication with the secondary residue stream, the control valve being adapted to selectively adjust a pressure of the secondary residue stream;
measuring a purity of the fast gas in the product gas;
sending a signal to a controller representative of the measured purity, wherein the controller controls the adjustment of the secondary residue stream pressure based upon the product gas purity signal via the control valve in fluid communication with the secondary residue stream.
the method further comprises the steps of:
providing a controller;
performing said method steps while the feed gas stream has a first flow rate;
changing the number of cooling towers from which the feed gas stream is obtained thereby changing the flow rate of the feed gas stream;
sending a signal to the controller representative of the new number of cooling towers from which the feed gas is obtained;
adjusting with the controller the degree to which the primary permeate stream is allocated between the first portion and the remaining portion based upon the signal.
the method further comprises the steps of:
measuring a pressure of the combined feed gas stream and first portion of permeate stream;
providing a control valve in fluid communication with the primary permeate stream; and
sending a signal to a controller representative of the measured pressure, wherein:
the operating parameter is the pressure of the combined feed gas stream and first portion of permeate stream; and
the controller controls the allocation of the primary permeate stream into the first portion and the remaining portion via the control valve based upon the signal.
the fast gas and slow gas are selected from the group consisting of: $H_2$ and Ne, $H_2$ and $CO_2$, $H_2$ and $CH_4$, $H_2$ and $N_2$, $H_2$ and $O_2$, $H_2$ and $O_2/N_2$, $CO_2$, and $N_2$, $CO_2$ and $O_2$, $CO_2$ and $N_2/O_2$, $CO_2$ and $CH_4$, Ne and $N_2$, Ne and $O_2$, Ne and $N_2/O_2$, He and $N_2$, He and $O_2$, He and $N_2/O_2$
the fast gas is Helium and the slow gas is air.
a secondary gas separation membrane hays an inlet in fluid communication with the residue outlet of the primary gas separation membrane, a secondary residue outlet, and a secondary permeate outlet; and a secondary permeate conduit is in fluid communication between the permeate outlet of the secondary gas separation membrane the recycle conduit.

a secondary gas separation membrane has an inlet in selective fluid communication with the plurality of sources, a secondary residue outlet, and a secondary permeate outlet in fluid communication with the feed gas conduit.

a device sensing whether or not one or more of the sources are actively producing the exhaust gas is included, wherein the controller is further adapted to receive a signal from the sensing device representative of the number of sources that are actively producing the exhaust gas and control the proportionate adjustment by the recycle control valve based upon the signal.

the controller is further adapted to:
receive a signal from a sensing device that is representative of a recovery of the fast gas that is achieved by operation of said system; and
control the proportionate adjustment by the recycle control valve based upon the recovery signal.

a sensing device is included that is adapted to measure a concentration of the fast gas in product gas in the product gas conduit and send a signal to the controller representative of the measured concentration, wherein the controller is further adapted to:
receive the concentration signal from the sensing device; and
control the proportionate adjustment by the recycle control valve based upon the concentration signal.

a secondary gas separation membrane is included that has an inlet in fluid communication with the residue outlet of the primary gas separation membrane, a secondary residue outlet, and a secondary permeate outlet.

a secondary permeate conduit is in fluid communication between the permeate outlet of the secondary gas separation membrane the recycle conduit, wherein the sources are optical fiber cooling towers and the fast gas is Helium.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

The present method and system are directed to the use of one or two gas separation membrane stages in series using a partial recycle of the permeate stream that is capable of achieving a sufficiently high purity of a fast gas of interest at a sufficiently high recovery from a process producing widely varying flows of a gas mixture including the fast gas and one or more slow gases.

Those skilled in the art of membrane-based gas separation will recognize that there are numerous combinations of gas mixtures and gas separation membranes that separate the gas mixture into a permeate stream comprising a fast gas and a residue stream comprising one or more slow gases. They will understand that the disclosed method and system may be applied to any such combination. Specific examples of fast gas and slow gas combinations include, but are not limited to: $H_2$ and Ne, $H_2$ and $CO_2$, $H_2$ and $CH_4$, $H_2$ and $N_2$, $H_2$ and $O_2$, $H_2$ and $O_2/N_2$, $H_2$ and air, $CO_2$, and $N_2$, $CO_2$ and $O_2$, $CO_2$ and $N_2/O_2$, $CO_2$ and air, $CO_2$ and $CH_4$, Ne and $N_2$, Ne and $O_2$, Ne and $N_2/O_2$, Ne and air, He and $N_2$, He and $O_2$, He and $N_2/O_2$, He and air.

The gas mixture containing the fast and slow gases comes from a process that produces the gas mixture at varying flow rates. While those skilled in the art of membrane-based gas separation will recognize that there are numerous types of such processes, specific examples of such processes include, but are not limited to optical fiber production processes utilizing Helium cooling in a plurality of cooling towers and processes utilizing Helium cooling from a plurality of vacuum furnaces.

Regardless of which particular process the gas mixture is derived from, the gas mixture containing the fast and slow gases is collected from one or more sources of the gas mixture (such as cooling towers or vacuum furnaces) to provide a feed gas stream for treatment by one or more gas separation membranes. The present method and system utilize a fixed membrane area. This means that no portion of the total membrane surface area is added or removed when the feed gas flow rate decreases or increases. The present method and system are capable of maintaining or exceeding useful product purities (for example, >99+ %) and maintaining or exceeding useful product recoveries (for example, >90%) under a turndown range as broad as 0-87.5%. This unexpectedly good flexibility is achieved by a partial recycle of the permeate stream.

The present method and system is especially applicable to a plurality of cooling towers or plasma furnaces, each of which is not necessarily operating all of the time. For example, during times of peak production of optical fiber or furnace operation, all of the cooling towers (for example 6) or furnaces may be in operation. On the other hand, during times of minimal production, fewer than all of the cooling towers (for example 1) or furnaces may be in operation.

Figure 1:
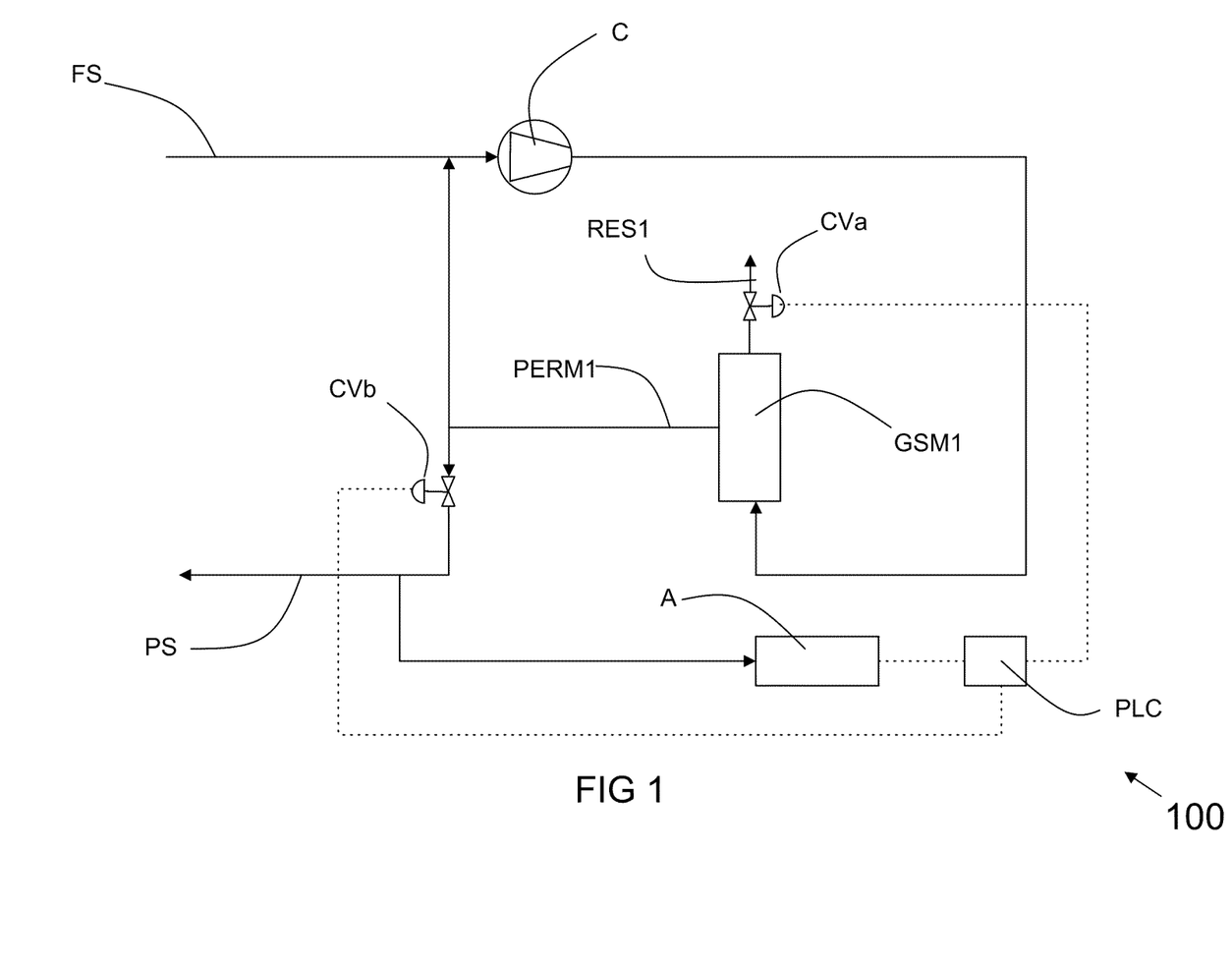
FIG. 1 is a schematic of one embodiment the process and system for recovering a gas of interest from a process producing a wide variation in flow rates.
Figure 2:
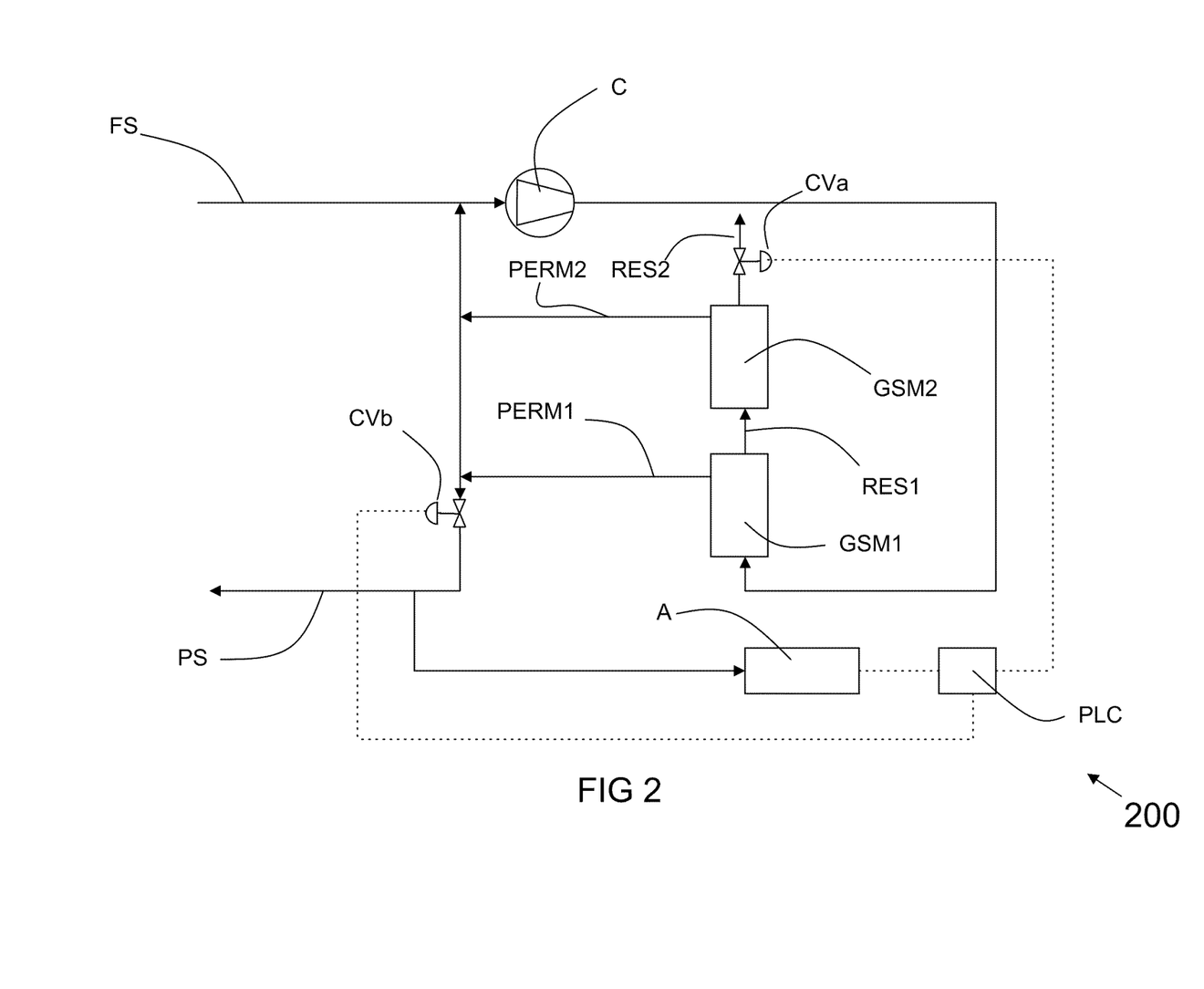
FIG. 2 is a schematic of another embodiment the process and system for recovering a gas of interest from a process producing a wide variation in flow rates.
Figure 3:
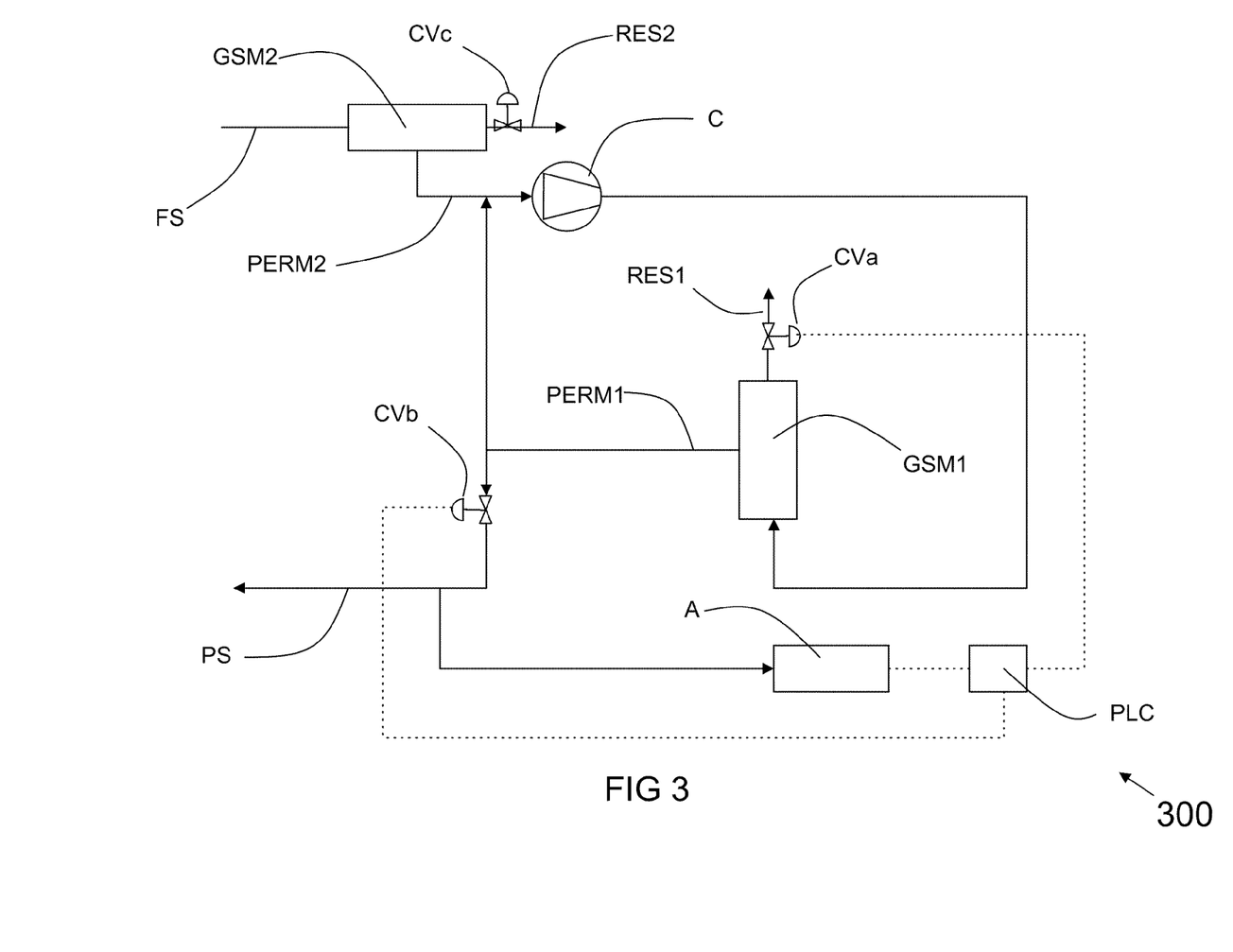
FIG. 3 is a schematic of another embodiment the process and system for recovering a gas of interest helium from a process producing a wide variation in flow rates.

A description of a first set of three embodiments now follows with reference to FIGS. 1-3.

With reference to FIG. 1, the system 100 includes a feed stream FS comprising the fast and slow gases that has a variable flow rate and is collected from a plurality of sources (not shown) of the mixture of fast and slow gases. Over a period of time, the flow rate may vary by as much as a factor of 8:1 with 8 representing the maximum flow rate and 1 representing the minimum flow rate. This corresponds to a turndown of 87.5%. The feed stream FS may be at ambient, super ambient, or sub ambient pressure depending upon upstream processing.

The feed stream FS is directed to the inlet of a compressor C where it is compressed to about the operating pressure of the gas separation membrane GSM1. At the membrane GSM1, the fast gas of interest (such as Helium) preferentially permeates across the membrane. The resulting permeate stream PERM1 is enriched in the fast gas and deficient in the slow gases (such as the air gases Oxygen and Nitrogen). The non-permeate portion of the gas mixture leaves the membrane GSM1 as residue stream RES1.

One of ordinary skill in the art will recognize that the relative size of the membrane GSM1 (or the relative sizes of the membranes GSM1, GSM2 in the embodiments of FIGS. 2-3 and 5-6) may be calculated based upon the total surface area of the membrane GSM1 (or the total surface area of the membranes GSM1, GSM2 in the embodiments of FIGS. 2-3 and 5-6) which is a factor of the expected maximum flow rate of the feed stream FS. In other words, the amount of the feed stream FS that is obtained when all the sources of the mixture of fast and slow gases (such as cooling towers or Helium furnaces) are being operated at full capacity will drive the size of the membrane GSM1 (or the size of the membranes GSM1, GSM2) utilized. One of ordinary skill in the field of gas separation will recognize that, based upon the composition of the feed stream FS (hence, the fast and slow gases), a suitable type of material for the membrane GSM1 (and in the case of systems 200, 300, the membrane GSM2) may be selected.

The permeate stream PERM1 is split into two flows. One flow is combined with the feed stream FS and sent back to the compressor C. The other flow is directed through control valve CVb to provide a product stream PS. A small portion of the product stream PS is withdrawn either continuously or at intervals by analyzer A and the concentration of the fast gas of interest (or equivalent parameter corresponding to the concentration of the gas of interest such as thermal conductivity) is measured. In normal operation, the product stream PS has a purity useful for product (for example, over 99%). A signal representative of the measured purity is sent by the analyzer A to the programmable logic controller PLC.

As illustrated in FIG. 2, system 200 differs from system 100, because it provides a second gas separation membrane GSM2 placed in series downstream of gas separation membrane GMS1. Residue stream RES1 is directed to the inlet of the second membrane GSM2. The residue stream RES2 from the second membrane GMS2 is sent to vent through control valve CVa. As before, a portion of the permeate stream PERM1 is directed past control valve CVb and withdrawn as the product stream PS while another portion is combined with the feed stream FS for compression at the compressor C. All of the permeate stream PERM2 from the second gas separation membrane GSM2 is also combined with the feed stream FS and the above-mentioned portion of the first stage permeate stream PERM1. It should be noted that the positions of the two permeate streams PERM1, PERM2 relative to the control valve CVb and the compressor C should be separated by a sufficient distance. This allows all of the permeate stream PERM2 to be directed to the compressor C instead of flowing towards the control valve CVb.

The series arrangement of system 200 is advantageous in that it provides greater recovery of the fast gas in comparison to only one gas separation membrane stage. It should be noted that more than two stages of membrane-based gas separation may be implemented. If three gas separation membranes in series are used, the residue stream GSM2 will be directed to the third gas separation membrane instead of being vented and the permeate stream from the third gas separation membrane will be combined with those of the first and second gas separation membranes GSM1, GSM2. This concept can be expanded to additional stages whereby the second to last residue stream is directed to the inlet of the last stage and all but the first permeate streams PERM1 are recycled back to the compressor C. The limit to the number of stages will be largely determined by the capacity of the compressor C to compress the combined permeate flows to achieve a feed to the inlet of the first gas separation membrane GSM1 that has a sufficiently high enough pressure.

As best shown in FIG. 3, the system 300 is similar to system 100 except that two gas separation membranes GSM1, GSM2 are used. The feed stream FS is fed to the inlet of the second membrane GSM2 where the fast gas of interest (such as Helium) preferentially permeates therethrough in comparison to the slow gas(es) (such as the air gases Oxygen and Nitrogen). The residue stream RES2 from the second membrane GSM2 is vented in a controlled manner by control valve CVc, while the permeate stream PERM2 is combined with a portion of the permeate stream PERM1 from the first membrane GSM1 and directed to the compressor C. The control valve CVc may be adjusted by the controller PLC to assist in achieving a desired fast gas purity and recovery.

The use of two stages of membrane-based gas separation in system 300 allows greater purity to be achieved in the product stream PS and allows reduction in the size of the compressor C. It also allows enhanced recovery of the fast gas because the efficiency of the recovery by gas separation membrane GSM1 is boosted by the higher fast gas concentration resulting from utilizing the permeate stream PERM2 from gas separation membrane GSM2 as the feed stream FS.

With reference to each of the embodiments of FIGS. 1-3, the method and system may be controlled in a number of ways. Many different types of operating parameters may be controlled through manipulation of the control valves CVa, CVb. Those skilled in the art of membrane-based gas separation will recognize that control of one parameter will have an effect upon another parameters. For example, an adjustment of product stream PS purity upwards may have a detrimental effect upon recovery. Thus, it may be preferably to simultaneously or contemporaneously control more than one operating parameter at a time.

The purity of the product stream PS may be controlled. The purity of the product stream PS is the same as the purity of PERM1 and preferably may be controlled through adjustment by the controller PLC of control valve CVa to increase or decrease the backpressure on the residue stream RES1 (or in the case of system 200 the residue stream RES2). When the controller PLC determines that the purity is below the setpoint, it opens CVa to decrease the backpressure at the residue stream RES1 (or residue stream RES2 in the case of system 200). This increases the driving force for the fast gas across the membrane GSM1 and thereby the purity in the permeate stream PERM1 and product stream PS. Until the purity of the fast gas to be recovered and reused reaches a desired setpoint, the product stream PS may be vented or supplemented with a pure fast gas. Once the purity reaches the desired setpoint, the control valve CVa may be kept at its current setting. The skilled artisan will recognize that adjustment of purity upwards may have the effect of adjusting the recovery downwards. If the purity goes too far above the purity setpoint, the control valve CVa may be adjusted down to increase the backpressure at the residue stream RES1 (or in the case of system 200 the residue stream RES2) and thereby reduce the purity of streams PERM1 and PS.

Alternatively, the purity may be controlled in a less preferred way by adjusting the degree to which control valve CVb diverts a portion of the permeate stream PERM1 to be recycled back to combine with the feed gas stream FS (or in the case of the system 200, also with the permeate stream PERM2 from the second membrane GSM2). When the purity is too low, the controller PLC adjusts the control valve CVb to decrease the fraction of the permeate stream PERM1 to the product stream PS, thereby recycling a greater portion for combination with the feed gas stream FS. Once the purity of the product stream PS reaches the desired setpoint, the control valve CVb may be kept at its current setting and the degree to which the permeate stream PERM1 is recycled may be fixed.

The recovery of the fast gas may be controlled. While one of ordinary skill in the art will recognize that the recovery of the fast gas may be calculated in a wide variety of ways and that numerous mathematical derivations may be made from such calculations, two typical ways of calculating the recovery include the following formulae:

$$R = \frac{MFR_{product} \times C_{product}}{(MFR_{product} \times C_{product}) + (MFR_{residue} \times C_{residue})}; \text{ or} \quad 1)$$

$$R = \frac{MFR_{product} \times C_{product}}{MFR_{feed} \times C_{feed}} \quad 2)$$

where MFR is mass flow rate and C is the concentration. Alternatively, if the method and system are running properly, the concentrations of the feed stream FS and product stream PS may be assumed to be constant. Thus, the recovery would be calculated as the mass flow rate of the product stream PS divided by the mass flow rate of the feed stream FS. In yet another alternative, when the product stream PS is supplemented with pure fast gas and recycled back to the varying flow rate source, preferably the recovery is calculated as mass flow rate of the product stream PS divided by the mass flow rate of the flow of combined product stream PS and makeup pure fast gas. Regardless of whichever way recovery is defined, signals representative of the parameters upon which recovery is calculated are sent to the controller PLC to derive the recovery and compare it with the setpoint recovery.

With continued reference to the embodiments of FIGS. 1-3, the recovery may be controlled by adjusting the degree to which control valve CVb diverts a portion of the permeate stream PERM1 to be recycled back to combine with the feed gas stream FS (or in the case of system 200, also with the permeate stream PERM2 from the second membrane GSM2). When the recovery is too low, the controller PLC adjusts the control valve CVb to decrease the fraction of the permeate stream PERM1 to the product stream PS, thereby recycling a greater portion for combination with the feed gas stream FS. Once the recovery of the product stream PS reaches the desired setpoint, the control valve CVb may be kept at its current setting and the degree to which the permeate stream PERM1 is recycled may be fixed.

Alternatively, the recovery may be controlled in a less preferred way through adjustment by the controller PLC of control valve CVa to increase or decrease the backpressure on the residue stream RES1. When the controller PLC determines that the recovery is below the setpoint, it adjusts CVa to increase the backpressure at the residue stream RES1 (or residue stream RES2 in the case of system 200). This increases the total amount of the fast gas permeating across the membrane GSM1 and thereby the recovery in the permeate stream PERM1 and product stream PS. Once the recovery reaches the desired setpoint, the control valve CVa may be kept at its current setting. The skilled artisan will recognize that the gain in recovery may come at the expense of purity since relatively more permeation of the slow gas(es) across the membrane GSM1 (or membrane GSM2 in the case of system 200) will occur after an increase in the backpressure of the residue stream RES1 (or residue stream RES2 in the case of system 200). If the recovery goes too far above the recovery setpoint, the control valve CVa may be adjusted down to decrease the backpressure at the residue stream RES1 and thereby reduce the recovery of fast gas in the permeate stream PERM1 (and consequently the product stream PS). As a result, the purity of the permeate stream PERM1 and product stream PS will be increased.

As discussed above, as a consequence of increasing the recovery to a level beyond the recovery setpoint, the purity may drop below a desired setpoint and vice versa. Thus, both the purity and recovery may be controlled in concert and several iterations of purity and recovery adjustments may need to be made.

The purity and/or recovery may also be controlled with a scheme that is optimized for certain regularly observed flow rates in the feed stream FS. The systems 100, 200, 300 will encounter a number of regular flow rates corresponding to the number of sources producing the gas mixture of fast and slow gases. For example, in the optical fiber manufacturing process, as few as one or as many as all of several (such as six) cooling towers may be in operation at any given time. As a result, the feed gas of air-diluted Helium will have a number of regular flow rates (such as six) that correspond to the number of cooling towers. In order to optimize the system 100, 200, 300, each combination of settings for the control valves CVa, CVb (and optionally CVc) corresponding to desired purity and recovery levels for a particular flow rate are stored in the controller PLC.

Thus as an example, for application to a six cooling tower optical fiber production process or a six vacuum furnace heat treating process, there will be six flow rates for the feed stream FS and six combinations of settings for the control valves CVa, CVb (and optionally CVc). When a cooling tower or vacuum furnace is either placed in operation or taken out of operation, a signal is sent to the controller PLC which automatically adjusts the control valves CVa, CVb (and optionally CVc) according to the stored settings corresponding to the flow rate that is produced by the new number of cooling towers or furnaces.

One of ordinary skill in the art will recognize that such a signal may be generated in a number of different ways known in the field of process control. The signal may be predicated upon signals from flowmeters associated with the sources of the gas mixture (containing the fast and slow gases) from which the feed gas stream is obtained. As a particular flowmeter senses a non-zero flow, the signal it produces will be representative of whether or not the source of the gas mixture associated with the flowmeter is actively producing the gas mixture from which the feed gas stream is derived. Alternatively, the signal may be predicated upon signals from a flowmeter associated with a supply manifold for recycling a combined flow of the product gas and supplemental pure fast gas back to the sources from which the feed gas is obtained. As the sensed flow increases or decreases, the signal will be representative of how many of the sources are being supplied with the product gas and thus how many sources the feed stream is being obtained from.

Figure 4:
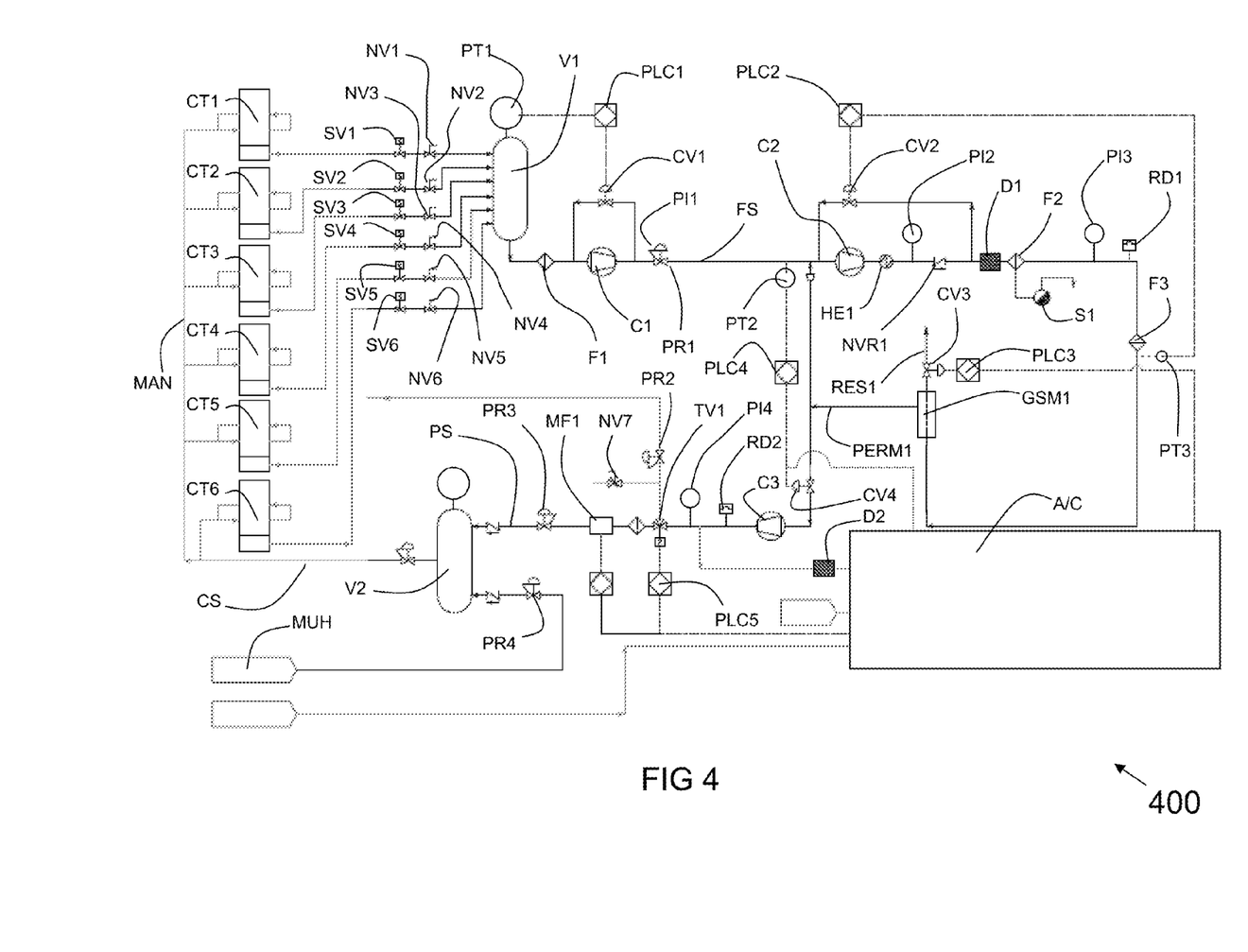
FIG. 4 is a schematic of one embodiment of the process and system for recovering helium from an optical fiber production process.
Figure 5:
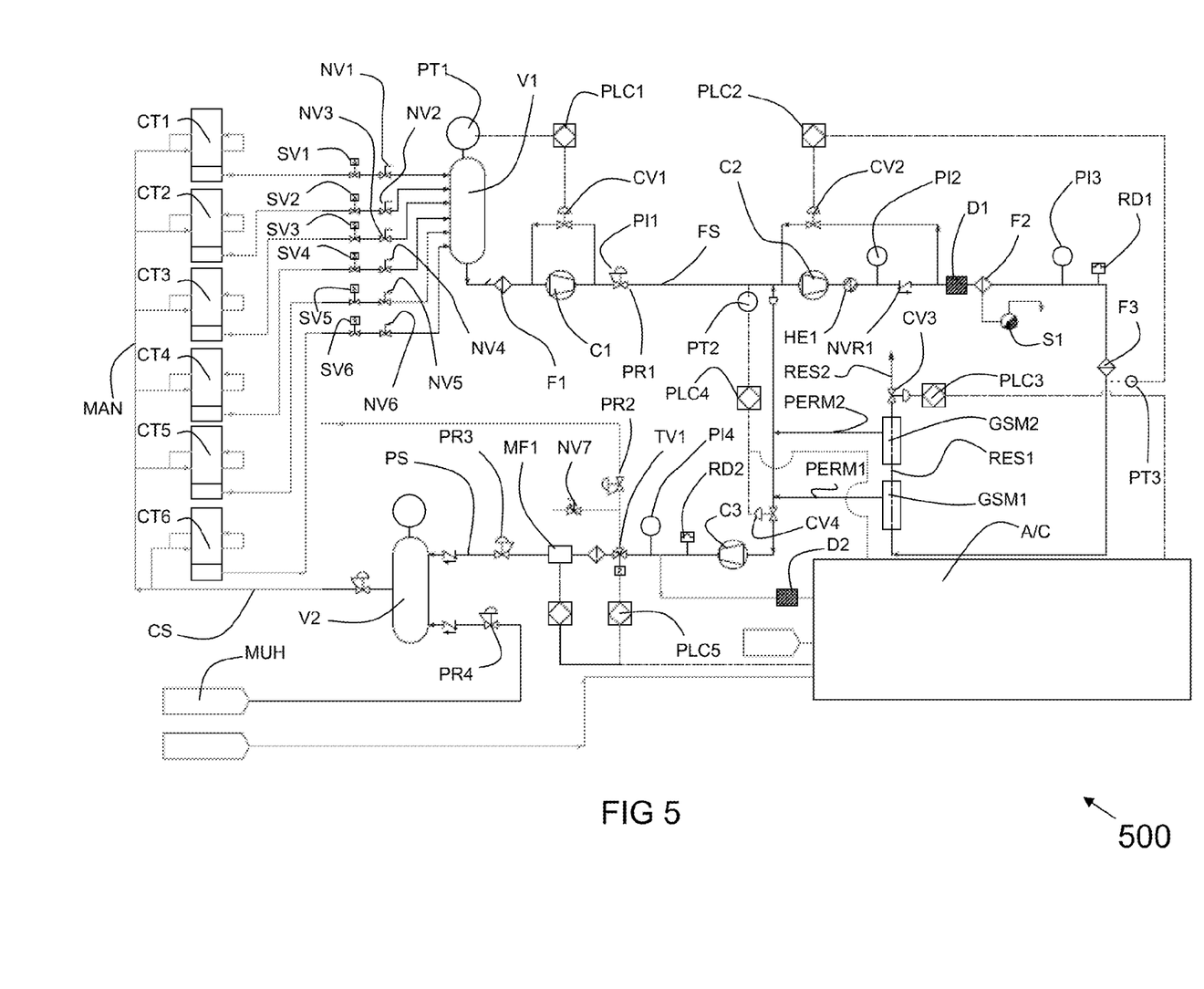
FIG. 5 is a schematic of another embodiment of the process and system for recovering helium from an optical fiber production process.
Figure 6:
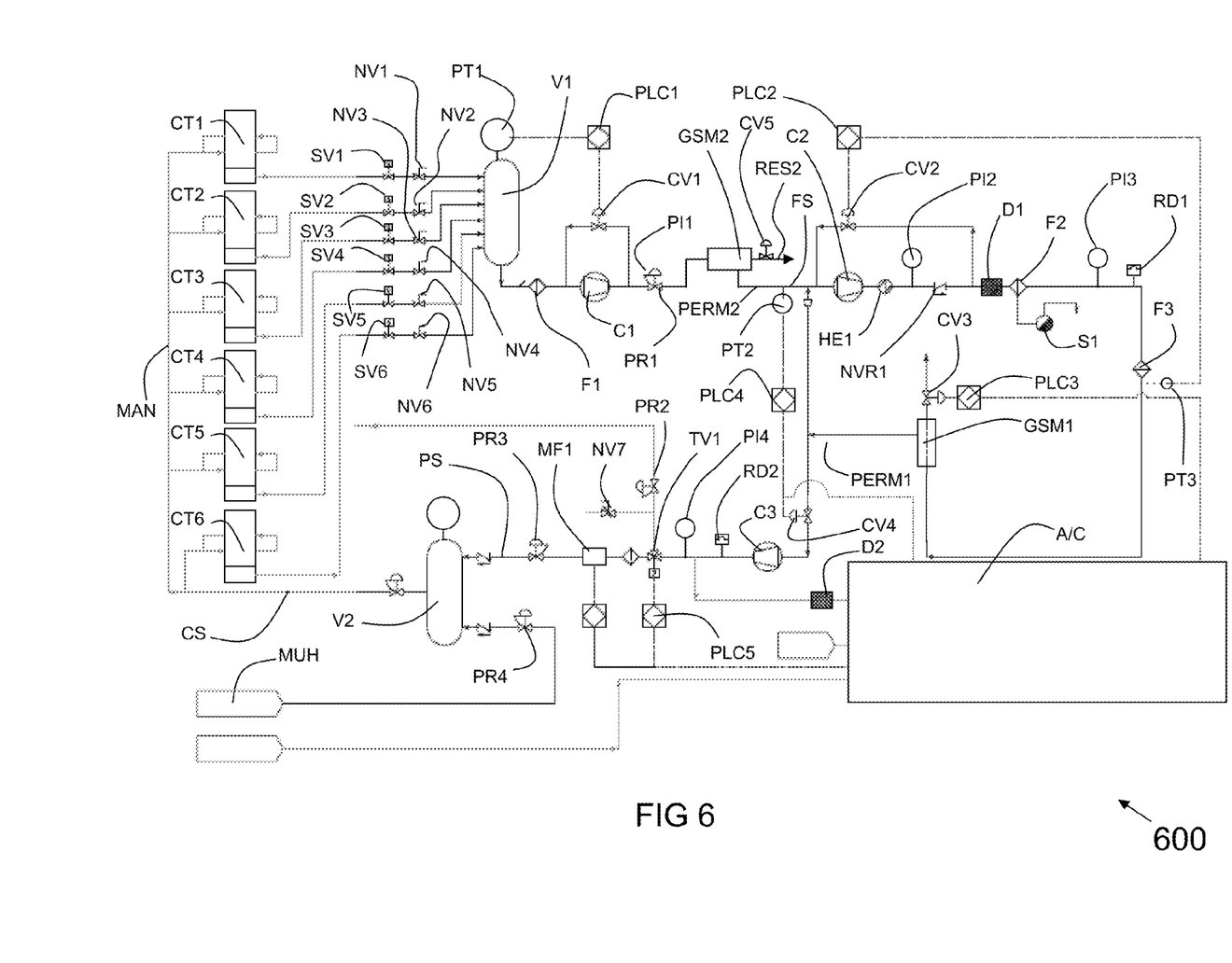
FIG. 6 is a schematic of another embodiment of the process and system for recovering helium from an optical fiber production process.

A description of a second set of three (and particularly preferred) embodiments now follows with reference to FIGS. 4-6.

As best shown in FIG. 4, system 400 includes cooling towers CT1, CT2, CT3, CT4, CT5, CT6. Depending upon whether fewer than all of them are being operated, a gas manifold MAN provides a coolant gas containing a relatively high concentration of the fast gas Helium (typically 99+%) to each of the towers CT1, CT2, CT3, CT4, CT5, CT6 that is currently in operation. The Helium is used to cool the hot optical fiber traversing therethrough. Due to the relatively high speed of the optical fiber's passage, an amount of air (primarily the slow gases Oxygen and Nitrogen) is drawn into the upstream end of the cooling tower CT1, CT2, CT3, CT4, CT5, CT6.

A gas mixture including the air and the spent Helium is withdrawn from a tower CT1, CT2, CT3, CT4, CT5, CT6 by associated gas recovery caps. Gas recovery caps are well known to those skilled in the art as being adapted to enhance recovery of coolant gas. Particularly suitable gas recovery caps include those disclosed in U.S. Published Patent Application No. US 20070113589. Due to the pressure difference between an inside of the cooling tower CT1, CT2, CT3, CT4, CT5, CT6 and the vacuum that is applied to the gas caps, the gas mixture flows through a shutoff valve SV1, SV2, SV3, SV4, SV5, SV6 and a needle valve NV1, NV2, NV3, NV4, NV5, NV6 and into buffer vessel V1. When one of the cooling towers CT1, CT2, CT3, CT4, CT5, CT6 is not in operation, the associated shutoff valve SV1, SV2, SV3, SV4, SV5, SV6 is of course closed in order to avoid unnecessary infiltration of air into the vessel V1.

The air/Helium gas mixture in vessel V1 then flows through a filter F1 in order to remove particulate matter and into the inlet of a first compressor C1. The pressure (in relative terms, the vacuum) in the vessel V1 is controlled through operation of a recycle loop associated with the first compressor C1. Pressure transducer PT1 measures the pressure within vessel V1 and transmits it to programmable logic controller PLC1 having a pressure setpoint (typically about 850 mbara or millibar absolute). When the pressure in the vessel V1 is too high (in relative terms, the vacuum level is too low), the controller PLC1 adjusts the first control valve CV1 to decrease recycling of the air/Helium gas mixture from the outlet of the compressor C1 to the inlet. When the pressure is too low, the controller PLC1 adjusts the valve CV1 to increase recycling of the gas mixture from the outlet of the compressor C1 to the inlet. By controlling the pressure within the vessel V1, the degree of vacuum applied to each of the gas caps (and thus the amount of gas mixture withdrawn from the cooling towers CT1, CT2, CT3, CT4, CT5, CT6) may be fine-tuned with needle valves NV1, NV2, NV3, NV4, NV5, NV6. The pressure of the air/Helium gas mixture downstream of the recycle loop associated with the first compressor C1 may be monitored at pressure indicator P11.

The feed stream FS made of the air/Helium gas mixture is then combined with a portion of a permeate stream PERM1 from the gas separation membrane GSM1 and directed to the inlet of the second compressor C2. Downstream of the compressor C2, the combined feed stream FS/permeate stream PERM1 is cooled at heat exchanger HE1, dried at first dryer D1, and directed to filter F2. At filter F2, particulates and condensates are separated from the combined gas mixture/permeate and directed to separator S1 for removal. The compressed, cooled, and filtered gas mixture exiting the filter F2 is further cleaned of particulates at filter F3.

The pressure of the compressed, cooled, and filtered gas stream downstream of the filter F3 is at least partially controlled by a recycle loop associated with the compressor C2. A third pressure transducer PT3 measures a pressure of the gas stream and sends a signal representative of the measured pressure it to controller PLC2. If the measured pressure is lower than the setpoint of the controller PLC2, the controller PLC2 adjusts the second control valve CV2 to restrict recycling of the combined gas mixture through a recycle loop associated with the compressor C2. Similarly, if the pressure of the gas stream is too high, the PLC2 adjusts the valve CV2 to allow greater recycling through the recycle loop. If the pressure reaches an uncontrolled high level, may be relieved at the first rupture disc RD1. A pressure of the cooled, dried stream, and cleaned gas stream may be observed at the third pressure indicator P13.

The cleaned gas stream is then directed into the inlet of the first gas separation membrane GSM1 where the fast gas Helium preferentially permeates through in the permeate stream PERM1. The non-permeate portion of the cleaned gas stream (enriched in the slow air gases Oxygen and Nitrogen and deficient in Helium) exits the residue port of the membrane GSM1 and is vented through the third control valve CV3 as a residue stream RES1.

The membrane GSM1 may be made of any material known to those in the art of gas separation as being suitable for separating Helium from air.

The permeate stream PERM1 is split into two flows. The first portion is combined with the feed stream FS downstream of the pressure indicator P11 and directed to the inlet of the compressor C2. The second portion flows through fourth control valve CV4 and to the inlet of the third compressor C3. If the pressure downstream of the compressor C3 reaches an uncontrolled high level, it may be relieved at the second rupture disc RD2. The pressure may be monitored at the fourth pressure indicator P14.

A small sample of the product gas is withdrawn and directed to the analyzer A/C where the Helium concentration (purity) is measured. Alternatively, some other parameter indicative of Helium concentration (such as thermal conductivity) may be measured. The purity serves for control of controllers PLC3, PLC5. The remainder of the product gas flows to three-way valve TV1. Controller PLC5 may briefly actuate valve TV1 to vent the product stream in a controlled manner via needle valve NV7 and pressure regulator PR2 until the target purity is reached. The mass flow rate of the product gas is measured mass flow meter MF1 and the pressure is adjusted with pressure regulator PR3. The product gas is collected in buffer vessel V2. The product gas is supplemented as necessary with high purity Helium MUH from the makeup helium source via pressure regulator PR4. The recovered Helium is then recycled as part of the combined stream CS which is directed from the vessel V2 to the manifold MAN.

As best illustrated in FIG. 5, the system 500 is similar to system 400 one difference being that a second gas separation membrane GSM2 is placed downstream of the gas separation membrane GSM1. In system 500, the residue stream RES1 from the gas separation membrane GSM1 is directed to an inlet of the second gas separation membrane GSM2. The fast gas Helium from the residue stream RES1 preferentially permeates across the second gas separation membrane GSM2 in comparison to the slow air gases Oxygen and Nitrogen. The entire portion of the permeate stream PERM2 from the second gas separation membrane GSM2 is combined with one portion of the permeate stream PERM1 and the feed stream FS for compression at compressor C2. Another portion of the permeate stream PERM1 from the membrane GSM1 is directed past the fourth control valve CV4 and further processed to provide the product stream PS. The membrane GSM2 may be made of any material known to those in the art of gas separation as being suitable for separating Helium from air. It should be noted that the positions of the two permeate streams PERM1, PERM2 relative to the control valve CV4 and the compressor C2 should be separated by a sufficient distance. This allows all of the permeate stream PERM2 to be directed to the compressor C2 instead of flowing towards the control valve CV4.

The series arrangement of system 500 is advantageous in that it provides greater recovery of the fast gas in comparison to only one gas separation membrane stage. Two stages of membrane-based gas separation provide a first stage permeate stream PERM1 that has a higher Helium purity than the second stage permeate stream PERM2. It should be noted that more than two stages of membrane-based gas separation may be implemented. If three gas separation membranes in series are used, the residue stream GSM2 will be directed to the third gas separation membrane instead of being vented and the permeate stream from the third gas separation membrane will be combined with those of the first and second gas separation membranes GSM1, GSM2. This concept can be expanded to additional stages whereby the second to last residue stream is directed to the inlet of the last stage and all but the first permeate streams PERM1 are recycled back to the compressor C2. The limit to the number of stages will be largely determined by: a) the capacity of the compressor C2 to compress the combined permeate flows to achieve a feed to the inlet of the first gas separation membrane GSM1 that has a sufficiently high enough pressure, and b) the purity of the last permeate (the last permeate must have a higher purity than that of the feed stream FS).

As best shown in FIG. 6, the system 600 is similar to system 400, one difference being that two gas separation membranes GSM1, GSM2 are used. The air/Helium gas mixture flowing downstream of the recycle loop associated with the compressor C1 is fed to the inlet of the second membrane GSM2 where Helium preferentially permeates through in comparison to Oxygen and Nitrogen. The residue stream RES2 from the second membrane GSM2 is vented, while the permeate stream PERM2 (forming the feed stream FS) is combined with a portion of the permeate stream PERM1 from the first membrane GSM1 and directed to the compressor C2. The membrane GSM2 may be made of any material known to those in the art of gas separation as being suitable for separating Helium from air.

The use of two stages of membrane-based gas separation in the system 600 allows greater purity to be achieved in the product stream PS and allows reduction in the size of the compressor C2. It also allows enhanced recovery of the fast gas because the efficiency of the recovery by gas separation membrane GSM1 is boosted by the higher fast gas concentration resulting from utilizing the permeate stream PERM2 from gas separation membrane GSM2 as the feed stream FS. In contrast, when the system 100 receives a relatively lower purity of Helium from the cooling towers CT1, CT2, CT3, CT4, CT5, CT6, it can sometimes be difficult to obtain the desired purity in the product stream PS during periods of low flows in the feed stream FS without detrimentally affecting the recovery. System 300 addresses this problem by boosting the initial purity of the feed stream FS through the use of gas separation membrane GSM2.

While systems 400, 500, 600 illustrate only six cooling towers, it should be noted that more may be used. The maximum number it can handle will depend upon the flows from of the cooling towers. If the flows are relatively small, then the systems 400, 500, 600 can handle much more than six. Generally speaking, the higher the total flow from the towers, the lower the recovery will be. So, the maximum number of towers is set by the lowest recovery that is considered acceptable. As the total flow from the towers goes up, though, the control valve CV3 will need to be appropriately sized. If the total flow produces a residue stream RES1 (or RES2) that is too high for the control valve CV3, a pair of control valves may be used instead.

Control of the Helium recovery method and system in the embodiments of FIGS. 4-6 may be done in a number of ways. Many different types of operating parameters may be controlled through manipulation of the control valves CV3, CV4. Those skilled in the art of membrane-based gas separation will recognize that control of one parameter will have an effect upon another parameters. For example, an adjustment of product stream PS purity upwards may have a detrimental effect upon recovery. Thus, it may be preferably to simultaneously or contemporaneously control more than one operating parameter at a time.

The purity of the product stream PS may be controlled. The purity of the product stream PS is the same as the purity of PERM1 and preferably may be controlled through adjustment by the analyzer/controller A/C of control valve CV3 to increase or decrease the backpressure on the residue stream RES1 (or in the case of system 500 the residue stream RES2). When the analyzer/controller A/C determines that the purity is below the setpoint, it opens CV3 to decrease the backpressure at the residue stream RES1 (or residue stream RES2 in the case of system 500). This increases the driving force for the fast gas across the membrane GSM1 and thereby the purity in the permeate stream PERM1 and product stream PS. Until the purity of the fast gas to be recovered and reused reaches a desired setpoint, the product stream PS may be vented or supplemented with a pure fast gas. Once the purity reaches the desired setpoint, the control valve CV3 may be kept at its current setting. The skilled artisan will recognize that adjustment of purity upwards may have the effect of adjusting the recovery downwards. If the purity goes too far above the purity setpoint, the control valve CV3 may be adjusted down to increase the backpressure at the residue stream RES1 (or in the case of system 500 the residue stream RES2) and thereby reduce the purity of streams PERM1 and PS.

Alternatively, the purity may be controlled in a less preferred way by adjusting the degree to which control valve CV4 diverts a portion of the permeate stream PERM1 to be recycled back to combine with the feed gas stream FS (or in the case of the system 500, also with the permeate stream PERM2 from the second membrane GSM2). When the purity is too low, the analyzer/controller A/C adjusts the control valve CV4 to decrease the fraction of the permeate stream PERM1 to the product stream PS, thereby recycling a greater portion for combination with the feed gas stream FS. Once the purity of the product stream PS reaches the desired setpoint, the control valve CV4 may be kept at its current setting and the degree to which the permeate stream PERM1 is recycled may be fixed. The recovery of the fast gas may be controlled. Any of the above-described ways of calculating recovery may be used. Preferably, the recovery is calculated as mass flow rate of the product stream PS divided by the mass flow rate of the combined stream CS. Regardless of whichever way recovery is defined, signals representative of the parameters upon which recovery is calculated are sent to the analyzer/controller A/C to derive the recovery and compare it with the setpoint recovery.

With continued reference to the embodiments of FIGS. 1-3, the recovery may be controlled by adjusting the degree to which control valve CV4 diverts a portion of the permeate stream PERM1 to be recycled back to combine with the feed gas stream FS (or in the case of system 500, also with the permeate stream PERM2 from the second membrane GSM2). When the recovery is too low, the analyzer/controller A/C adjusts the control valve CV4 to decrease the fraction of the permeate stream PERM1 to the product stream PS, thereby recycling a greater portion for combination with the feed gas stream FS. Once the recovery of the product stream PS reaches the desired setpoint, the control valve CV4 may be kept at its current setting and the degree to which the permeate stream PERM1 is recycled may be fixed.

Alternatively, the recovery may be controlled in a less preferred way through adjustment by the controller PLC of control valve CV3 to increase or decrease the backpressure on the residue stream RES1. When the analyzer/controller A/C determines that the recovery is below the setpoint, it adjusts CV3 to increase the backpressure at the residue stream RES1 (or residue stream RES2 in the case of system 500). This increases the total amount of the fast gas permeating across the membrane GSM1 and thereby the recovery in the permeate stream PERM1 and product stream PS. Once the recovery reaches the desired setpoint, the control valve CV3 may be kept at its current setting. The skilled artisan will recognize that the gain in recovery may come at the expense of purity since relatively more permeation of the slow gas(es) across the membrane GSM1 (or membrane GSM2 in the case of system 500) will occur after an increase in the backpressure of the residue stream RES1 (or residue stream RES2 in the case of system 500). If the recovery goes too far above the recovery setpoint, the control valve CV3 may be adjusted down to decrease the backpressure at the residue stream RES1 and thereby reduce the recovery of fast gas in the permeate stream PERM1 (and consequently the product stream PS). As a result, the purity of the permeate stream PERM1 and product stream PS will be increased.

As discussed above, as a consequence of increasing the recovery to a level beyond the recovery setpoint, the purity may drop below a desired setpoint and vice versa. Thus, both the purity and recovery may be controlled in concert and several iterations of purity and recovery adjustments may need to be made.

With continued reference to the embodiments of FIGS. 4-6, another way of controlling the method and system is directed to controlling a pressure associated with the compressor C2 through adjustment of the degree to which the control valve CVb diverts a portion of the permeate stream PERM1 to be combined with the feed stream FS downstream of pressure indicator PI1 and compressed at the compressor C2 versus allowing the permeate stream PERM1 to become the product stream PS. In contrast to the above-described two control schemes, the third way utilizes the variable of the feed stream FS pressure downstream of pressure indicator PI1 as measured by pressure transducer PT2. The pressure transducer PT sends a signal representative of the measured pressure to the analyzer/controller A/C. When the pressure is too low (below a low setpoint), the analyzer/controller A/C adjusts the control valve CV4 to increase the amount of the permeate stream PERM1 that is recycled. When the pressure is too high (above a high setpoint), the analyzer/controller A/C adjusts the control valve CV4 to decrease the amount of the permeate stream PERM1 that is recycled. When the purity is controlled in this third way, the recovery may be controlled in the above-mentioned first way.

The performance of the systems 400, 500, 600 may be optimized for certain regularly observed flow rates from the cooling towers CT1, CT2, CT3, CT4, CT5, CT6. For example, systems 400, 500, 600 will encounter a number of regular flow rates corresponding to the number of cooling towers in operation CT1, CT2, CT3, CT4, CT5, CT6. For example, a first flow rate will correspond to when only one of the six is in operation, while a second flow rate will correspond to when two of the six are in operation, and so on. In order to optimize the system 400, 500, 600, each combination of settings for the control valves CV3, CV4 (and optionally CV5) corresponding to optimized purity and recovery levels for a particular flow rate are stored in the analyzer/controller A/C. One skilled in the art of membrane-based gas separation will recognize that these combination of settings may be empirically determined through routine experimentation. Continuing the discussion of the example, there will be six flow rates and six combinations of settings for the control valves CV3, CV4 (and optionally CV5). When a cooling tower CT1, CT2, CT3, CT4, CT5, CT6 is either placed in operation or taken out of operation, a signal is sent to the analyzer/controller A/C which automatically adjusts the control valves CV3, CV4 (and optionally CV5) according to the stored settings corresponding to the flow rate that is produced by the new number of cooling towers CT1, CT2, CT3, CT4, CT5, CT6.

One of ordinary skill in the art will recognize that such a signal may be generated in a number of different ways known in the field of process control. The signal may be predicated upon signals from flowmeters associated with the cooling towers CT1, CT2, CT3, CT4, CT5, CT6. As the flowmeter senses a non-zero flow, the signal will be representative of whether or not the cooling tower CT1, CT2, CT3, CT4, CT5, CT6 associated with the flowmeter is actively producing the Helium/air exhaust gas from which the feed gas stream is derived. Alternatively, the signal may be predicated upon signals from a flowmeter associated with a supply manifold for recycling the product gas back to the cooling towers CT1, CT2, CT3, CT4, CT5, CT6. As the sensed flow increases or decreases, the signal will be representative of how many of the cooling towers CT1, CT2, CT3, CT4, CT5, CT6 are being supplied with the product gas and thus how many cooling towers CT1, CT2, CT3, CT4, CT5, CT6 the feed stream is being obtained from.

The disclosed methods and system present several advantages. They are capable of achieving 99%+% product gas purity (in particular, Helium) at greater than 90% recovery for widely varying flows in the feed gas stream. The economics of gas recovery are improved because a membrane separation system having a fixed membrane surface area is used (including one or two stages of gas separation membranes in series) to treat multiple cooling towers without an unacceptably high drop in either purity or recovery. The system is capable of at least 87.5% turndown while maintaining or exceeding product purity (>99+%) and recovery (>90%). This unique flexibility is achieved by a partial recycle of the permeate stream.

Preferred processes and apparatus for practicing the present invention have been described. It will be understood and readily apparent to the skilled artisan that many changes and modifications may be made to the above-described embodiments without departing from the spirit and the scope of the present invention. For example, in the embodiments of FIGS. 4-6, the control valves CV1, CV2, CV3, CV4 may be controlled with separate controllers PLC1, PLC2, PLC3, PLC4 or the control of two or three of them may be integrated into a single controller. Additionally, the set of needle valves NV1, NV2, NV3, NV4, NV5, NV6 may be replaced with a set of flow controllers. The foregoing is illustrative only and that other embodiments of the integrated processes and apparatus may be employed without departing from the true scope of the invention defined in the following claims.

What is claimed is:

1. A method of recovering a fast gas from a process producing a varying flow rate of an exhaust gas comprising a fast gas and at least one slow gas, said method comprising the steps of:
provproviding a plurality of sources of a gas mixture comprising the fast and slow gases, wherein the fast gas is Helium and the slow gas is air;
obtaining a feed gas stream from one or more of the sources, the feed gas stream comprising the fast and slow gases, the feed gas stream having a variable flow rate based upon how many of the plurality of sources are actively producing the gas mixture;
compressing the feed gas stream;
feeding the compressed feed gas to a primary gas separation membrane;
withdrawing from the primary gas separation membrane a primary permeate stream enriched in the fast gas and a primary residue stream deficient in the fast gas;
directing a first portion of the primary permeate stream to a compressor, wherein the first portion is comingled and compressed with the feed gas stream;
withdrawing a remaining portion of the primary permeate stream to provide a product gas;
adjusting a degree to which the primary permeate stream is allocated between the first portion and the remaining portion based upon an operating parameter of said method.

2. The method of claim 1, wherein the plurality of sources comprises a plurality of optical fiber cooling towers.

3. A method of recovering a fast gas from a process producing a varying flow rate of an exhaust gas comprising a fast gas and at least one slow gas, said method comprising the steps of:
providing a plurality of sources of a gas mixture comprising the fast and slow gases, wherein the plurality of sources comprises a plurality of Helium furnaces and the fast gas is Helium;
obtaining a feed gas stream from one or more of the sources, the feed gas stream comprising the fast and slow gases, the feed gas stream having a variable flow rate based upon how many of the plurality of sources are actively producing the gas mixture;
compressing the feed gas stream;
feeding the compressed feed gas to a primary gas separation membrane;
withdrawing from the primary gas separation membrane a primary permeate stream enriched in the fast gas and a primary residue stream deficient in the fast gas;
directing a first portion of the primary permeate stream to a compressor, wherein the first portion is comingled and compressed with the feed gas stream;
withdrawing a remaining portion of the primary permeate stream to provide a product gas;
adjusting a degree to which the primary permeate stream is allocated between the first portion and the remaining portion based upon an operating parameter of said method.

4. The method of claim 1, further comprising the steps of:
feeding the primary residue stream to a secondary gas separation membrane;
withdrawing from the secondary gas separation membrane a secondary permeate stream and a secondary residue stream; and
directing the secondary permeate stream to the compressor, wherein the secondary permeate stream is compressed with the first portion and the feed gas stream.

5. A method of recovering a fast gas from a process producing a varying flow rate of an exhaust gas comprising a fast gas and at least one slow gas, said method comprising the steps of:
providing a plurality of sources of a gas mixture comprising the fast and slow gases;
obtaining a feed gas stream from one or more of the sources, the feed gas stream comprising the fast and slow gases, the feed gas stream having a variable flow rate based upon how many of the plurality of sources are actively producing the gas mixture;
compressing the feed gas stream;
feeding the compressed feed gas to a primary gas separation membrane;
withdrawing from the primary gas separation membrane a primary permeate stream enriched in the fast gas and a primary residue stream deficient in the fast gas;
directing a first portion of the primary permeate stream to a compressor, wherein the first portion is comingled and compressed with the feed gas stream;
withdrawing a remaining portion of the primary permeate stream to provide a product gas;
adjusting a degree to which the primary permeate stream is allocated between the first portion and the remaining portion based upon an operating parameter of said method;
combining exhaust gas streams from one or more of the plurality of sources;
compressing the combined exhaust gas streams;
feeding the compressed combined exhaust gas streams to a secondary gas separation membrane; and
withdrawing from the secondary gas separation membrane a secondary permeate stream enriched in the fast gas and a secondary residue stream deficient in the fast gas, wherein the secondary permeate is the feed gas stream.

6. A method of recovering a fast gas from a process producing a varying flow rate of an exhaust gas comprising a fast gas and at least one slow gas, said method comprising the steps of:
providing a plurality of sources of a gas mixture comprising the fast and slow gases;
obtaining a feed gas stream from one or more of the sources, the feed gas stream comprising the fast and slow gases, the feed gas stream having a variable flow rate based upon how many of the plurality of sources are actively producing the gas mixture;
compressing the feed gas stream;
feeding the compressed feed gas to a primary gas separation membrane;
withdrawing from the primary gas separation membrane a primary permeate stream enriched in the fast gas and a primary residue stream deficient in the fast gas;
directing a first portion of the primary permeate stream to a compressor, wherein the first portion is comingled and compressed with the feed gas stream;
withdrawing a remaining portion of the primary permeate stream to provide a product gas;
adjusting a degree to which the primary permeate stream is allocated between the first portion and the remaining portion based upon an operating parameter of said method;
providing a control valve in fluid communication with the primary permeate stream; and
sending a signal to a controller representative of the number of the plurality of sources from which the feed gas stream is obtained, wherein:

the operating parameter is the number of the plurality of sources from which the feed gas stream is obtained; and the controller controls the allocation of the primary permeate stream into the first portion and the remaining portion via the control valve based upon the signal.

7. The method of claim 6, further comprising the steps of:
providing a control valve in fluid communication with the primary residue stream, the control valve being adapted to selectively adjust a pressure of the primary residue stream;
measuring a purity of the fast gas in the product gas; and
sending a signal to the controller representative of the measured purity, wherein the controller controls the adjustment of the pressure of the primary residue stream based upon the measured purity via the control valve in fluid communication with the primary residue stream.

8. The method of claim 6, wherein:
a) said step of obtaining a feed gas stream comprises the steps of:
combining exhaust gas streams from one or more of the plurality of sources;
compressing the combined exhaust gas streams;
feeding the compressed combined exhaust gas streams to a secondary gas separation membrane; and
withdrawing from the secondary gas separation membrane a secondary permeate stream enriched in the fast gas and a secondary residue stream deficient in the fast gas, wherein the secondary permeate is the feed gas stream; and
b) said method further comprises the steps of:
providing a control valve in fluid communication with the secondary residue stream, the control valve being adapted to selectively adjust a pressure of the secondary residue stream;
determining a purity of the fast gas in the product gas; and
sending a signal to the controller representative of the measured purity, wherein the controller controls the adjustment of the pressure of the secondary residue stream based upon the measured purity via the control valve in fluid communication with the secondary residue stream.

9. The method of claim 1, further comprising the steps of:
providing a control valve in fluid communication with the primary permeate stream;
determining a recovery of the fast achieved by performance of said method;
sending a signal to a controller representative of the determined recovery, wherein:
the operating parameter is the recovery of the gas of interest achieved by performance of said method;
the controller controls the allocation of the primary permeate stream into the first portion and the remaining portion based upon the signal via the control valve.

10. The method of claim 9, further comprising the steps of:
providing a control valve in fluid communication with the primary residue stream, the control valve being adapted to selectively adjust a pressure of the primary residue stream;
measuring a purity of the fast gas in the product gas;
sending a signal to a controller representative of the measured purity, wherein the controller controls the adjustment of the primary residue stream pressure based upon the product gas purity signal via the control valve in fluid communication with the primary residue stream.

11. The method of claim 9, wherein:
a) said step of obtaining a feed gas stream comprises the steps of:
combining exhaust gas streams from one or more of the plurality of sources;
compressing the combined exhaust gas streams;
feeding the compressed combined exhaust gas streams to a secondary gas separation membrane; and
withdrawing from the secondary gas separation membrane a secondary permeate stream enriched in the fast gas and a secondary residue stream deficient in the fast gas, wherein the secondary permeate is the feed gas stream; and
b) said method further comprises the steps of:
providing a control valve in fluid communication with the secondary residue stream, the control valve being adapted to selectively adjust a pressure of the secondary residue stream;
measuring a purity of the fast gas in the product gas;
sending a signal to a controller representative of the measured purity, wherein the controller controls the adjustment of the secondary residue stream pressure based upon the product gas purity signal via the control valve in fluid communication with the secondary residue stream.

12. The method of claim 1, further comprising the steps of:
providing a controller;
performing said method steps while the feed gas stream has a first flow rate;
changing the number of cooling towers from which the feed gas stream is obtained thereby changing the flow rate of the feed gas stream;
sending a signal to the controller representative of the new number of cooling towers from which the feed gas is obtained;
adjusting with the controller the degree to which the primary permeate stream is allocated between the first portion and the remaining portion based upon the signal.

13. A method of recovering a fast gas from a process producing a varying flow rate of an exhaust gas comprising a fast gas and at least one slow gas, said method comprising the steps of:
providing a plurality of sources of a gas mixture comprising the fast and slow gases;
obtaining a feed gas stream from one or more of the sources, the feed gas stream comprising the fast and slow gases, the feed gas stream having a variable flow rate based upon how many of the plurality of sources are actively producing the gas mixture;
compressing the feed gas stream;
feeding the compressed feed gas to a primary gas separation membrane;
withdrawing from the primary gas separation membrane a primary permeate stream enriched in the fast gas and a primary residue stream deficient in the fast gas;
directing a first portion of the primary permeate stream to a compressor, wherein the first portion is comingled and compressed with the feed gas stream;
withdrawing a remaining portion of the primary permeate stream to provide a product gas;
measuring a pressure of the combined feed gas stream and first portion of permeate stream;
providing a control valve in fluid communication with the primary permeate stream;
sending a signal to a controller representative of the measured pressure;

adjusting a degree to which the primary permeate stream is allocated between the first portion and the remaining portion based upon an operating parameter of said method, wherein:
   the operating parameter is the pressure of the combined feed gas stream and first portion of permeate stream; and
   the controller controls the allocation of the primary permeate stream into the first portion and the remaining portion via the control valve based upon the signal; and
providing a control valve in fluid communication with the primary residue stream, the control valve being adapted to selectively adjust a pressure of the primary residue stream;
measuring a purity of the fast gas in the product gas;
sending a signal to a controller representative of the measured purity, wherein the controller controls the adjustment of the primary residue stream pressure based upon the product gas purity signal via the control valve in fluid communication with the primary residue stream.

* * * * *